United States Patent
Cheng (10) Patent No.: US 8,240,666 B2
(45) Date of Patent: Aug. 14, 2012

(54) SHEET FEEDER AND SCAN APPARATUS WITH SHEET-STOPPING FUNCTION INDEPENDENT OF MOVEMENT OF PICK-UP MECHANISM

(75) Inventor: Sung-Po Cheng, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 13/156,799

(22) Filed: Jun. 9, 2011

(65) Prior Publication Data
US 2011/0241278 A1    Oct. 6, 2011

Related U.S. Application Data (63) Continuation-in-part of application No. 12/640,566, filed on Dec. 17, 2009, now abandoned.

(30) Foreign Application Priority Data

Apr. 9, 2009    (TW) ................................ 98111764 A (51) Int. Cl.
   *B65H 9/04*    (2006.01)
(52) U.S. Cl. ........................................ 271/245; 271/117
(58) Field of Classification Search .................. 271/117, 271/243, 245
See application file for complete search history.

(56) References Cited

U.S. PATENT DOCUMENTS

| | | | | |
|---|---|---|---|---|
| 824,755 | A * | 7/1906 | Sturtevant, Charles | 271/246 |
| 4,925,062 | A * | 5/1990 | Tsukamoto et al. | 271/117 |
| 6,651,972 | B2 | 11/2003 | Hsiao et al. | |
| 7,255,339 | B2 | 8/2007 | Hung et al. | |
| 7,571,905 | B2 | 8/2009 | Kim | |
| 2003/0090053 | A1* | 5/2003 | Hsiao et al. | 271/118 |
| 2005/0263955 | A1 | 12/2005 | Kim | |
| 2008/0290586 | A1* | 11/2008 | Kuo | 271/10.11 |

* cited by examiner

*Primary Examiner* — Gerald McClain (57) ABSTRACT

In a scan apparatus, a sheet feeder having a sheet-stopping function includes a rotating shaft, a sheet-input roller, a pick-up mechanism and a sheet-stopping mechanism. The pick-up mechanism, including a bracket mounted on the rotating shaft and a pick-up roller mounted on the bracket, picks up a sheet from a paper tray. The sheet-stopping mechanism, driven independent of movement of the bracket by the rotating shaft, switches between a sheet-stopping state and a sheet-non-stopping state. The rotating shaft rotates in a first direction to enable the sheet-stopping mechanism to enter the sheet-non-stopping state and rotates in a second direction to enable the sheet-stopping mechanism to enter the sheet-stopping state, in which a passage to the sheet-input roller is blocked up.

12 Claims, 10 Drawing Sheets

SHEET FEEDER AND SCAN APPARATUS WITH SHEET-STOPPING FUNCTION INDEPENDENT OF MOVEMENT OF PICK-UP MECHANISM

This application is a Continuation-in-Part of application Ser. No. 12/640,566, filed on Dec. 17, 2009, now abandoned.

BACKGROUND OF THE INVENTION

1. Field of the Invention

The invention relates to a sheet feeder and a scan apparatus, and more particularly to a sheet feeder and a scan apparatus with a sheet-stopping function independent of movement of a pick-up mechanism.

2. Related Art

At present, image processing apparatuses, such as multi-function peripherals or scanners, are aimed to be reduced in volume and furnished with stylish industrial design. Thus, a horizontal supply tray may be designed to complement the functionality of the image processing apparatuses in order to reduce the size of the apparatuses or to achieve the special exterior requirement, and a pick-up mechanism for picking up the sheet from the supply tray may be added as well.

However, the pick-up mechanism has to work in conjunction with a sheet-stopping mechanism to prevent the sheets, which are not to be processed at the moment, from entering the sheet passageway. The conventional sheet-stopping mechanism is usually linked with the pick-up mechanism or driven by an independent actuator, and the conventional sheet-stopping mechanism has to be moved to an utmost point. Usually, a sensor is disposed to ensure that the execution of the sheet-stopping mechanism is certain and precise, and a driving torque of greater magnitude is required to move the sheet-stopping mechanism to the utmost point. If the sheet-stopping mechanism is driven by an independent actuator, the addition of the actuator will increase the production cost. If the sheet-stopping mechanism is linked with the pick-up mechanism, the sheet-stopping mechanism and the pick-up roller of the pick-up mechanism affect each other, and the variables to be considered in the design phase get more so that the design becomes complicated. In addition, a high-power driving motor has to be used. Furthermore, the size of the assembly of the conventional pick-up mechanism and the sheet-stopping mechanism cannot be effectively reduced.

SUMMARY OF THE INVENTION

It is therefore an object of the invention to provide a sheet feeder and a scan apparatus having a sheet-stopping function independent of movement of a pick-up mechanism. The sheet feeder, not being driven by a high-power motor, is minimized in size and produced at a lower cost.

To achieve the above-identified object, the invention provides a sheet feeder having a sheet-stopping function. The sheet feeder includes a rotating shaft, a sheet-input roller, a pick-up mechanism and a sheet-stopping mechanism. The rotating shaft is rotatable in a first direction and a second direction. The pick-up mechanism, including a bracket mounted on the rotating shaft and a pick-up roller mounted on the bracket, picks up a sheet. The sheet-input roller mounted on the rotating shaft feeds the sheet. The sheet-stopping mechanism, driven independent of movement of the bracket by the rotating shaft, switches between a sheet-stopping state and a sheet-non-stopping state. The rotating shaft rotates in the first direction to enable the sheet-stopping mechanism to enter the sheet-non-stopping state, in which the sheet is allowed to come into contact with the sheet-input roller, and rotates in the second direction to enable the sheet-stopping mechanism to enter the sheet-stopping state, in which a passage to the sheet-input roller is blocked up.

The invention also provides a scan apparatus including an image-reading module, a sheet-transporting mechanism, a paper tray and a sheet feeder. The sheet feeder picks up and feeds a sheet from the paper tray to the sheet-transporting mechanism. The sheet-transporting mechanism transports the sheet past the image-reading module. The image-reading module acquires an image of the sheet. The sheet feeder includes a rotating shaft, a sheet-input roller, a pick-up mechanism and a sheet-stopping mechanism. The rotating shaft is rotatable in a first direction and a second direction. The pick-up mechanism, including a bracket mounted on the rotating shaft and a pick-up roller mounted on the bracket, picks up the sheet from the paper tray. The sheet-input roller mounted on the rotating shaft feeds the sheet to the sheet-transporting mechanism. The sheet-stopping mechanism, driven independent of movement of the bracket by the rotating shaft, switches between a sheet-stopping state and a sheet-non-stopping state. The rotating shaft rotates in the first direction to enable the sheet-stopping mechanism to enter the sheet-non-stopping state, in which the sheet is allowed to come into contact with the sheet-input roller, and rotates in the second direction to enable the sheet-stopping mechanism to enter the sheet-stopping state, in which a passage to the sheet-input roller is blocked up.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

The invention provides a sheet feeder and a scan apparatus having the sheet-stopping function. The sheet feeder and the scan apparatus according to the preferred embodiments of the invention will be described with reference to the accompanying drawings.

Figure 1:
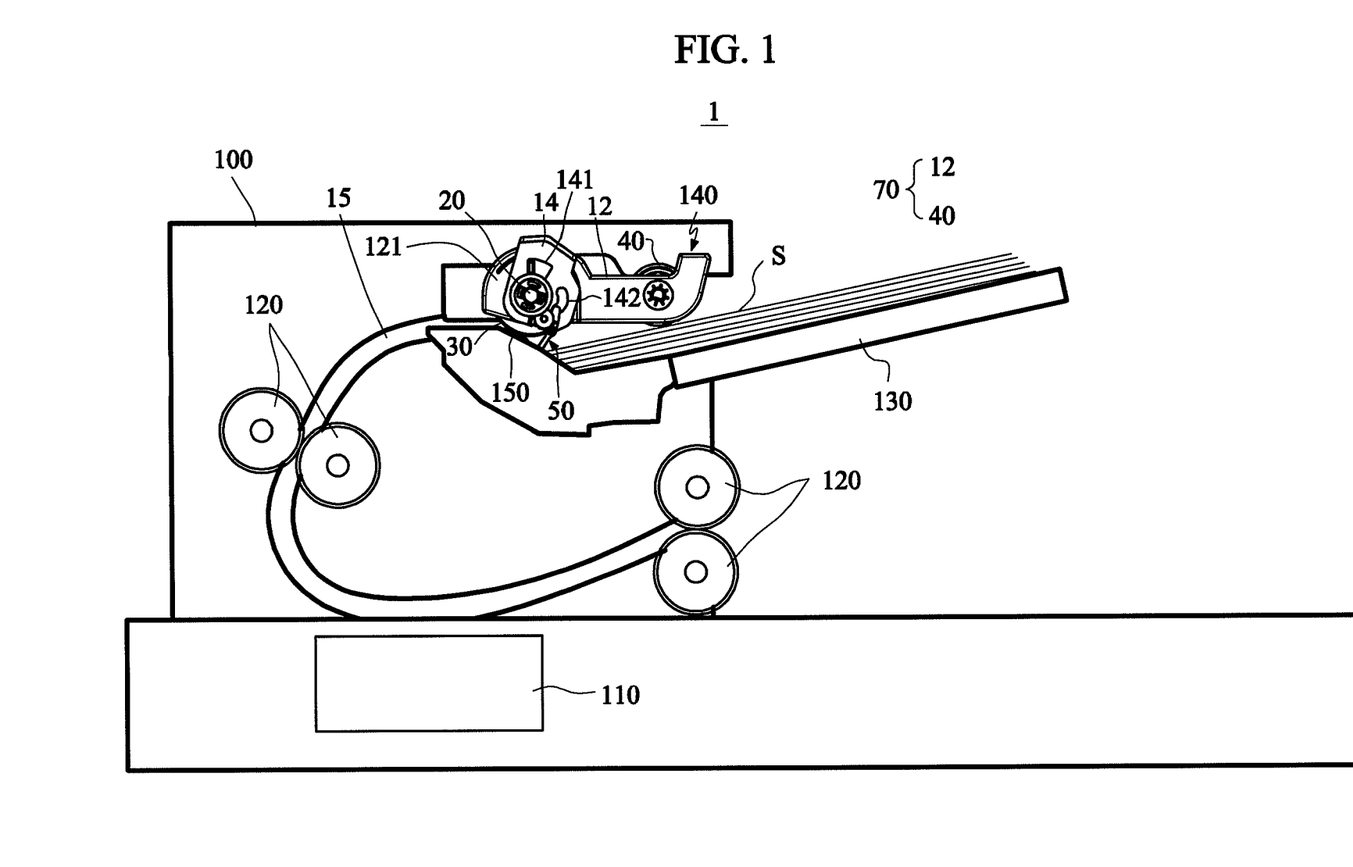
FIG. 1 is a schematic illustration showing a scan apparatus according to a first embodiment of the invention.

FIG. 1 is a schematic illustration showing a scan apparatus 1 according to the first embodiment of the invention. Referring to FIG. 1, the scan apparatus 1 of this embodiment includes a body 100, an image-reading module 110, a sheet-transporting mechanism 120, a paper tray 130 and a sheet feeder 140. The image-reading module 110 and the sheet-transporting mechanism 120 are disposed in the body 100. The paper tray 130 and the sheet feeder 140 are mounted on the body 100. The paper tray 130 can store a plurality of sheets S. The sheet feeder 140 picks up and feeds one of the sheets S from the paper tray 130 to the sheet-transporting mechanism 120. The sheet-transporting mechanism 120 transports the sheet S past the image-reading module 110, which acquires an image of the sheet S.

Figure 2:
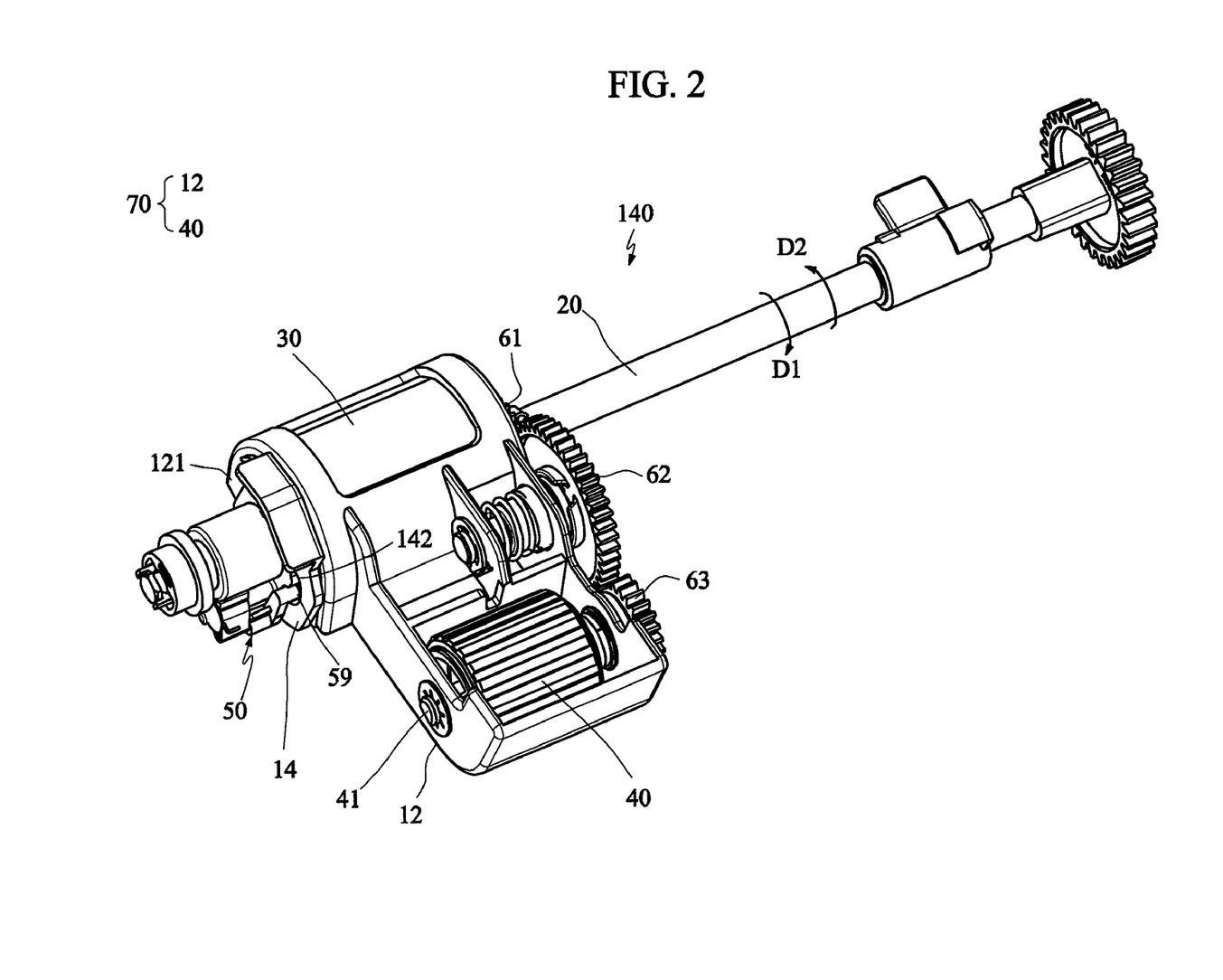
FIG. 2 is a pictorial view showing a sheet feeder according to the first embodiment of the invention.
Figure 3:
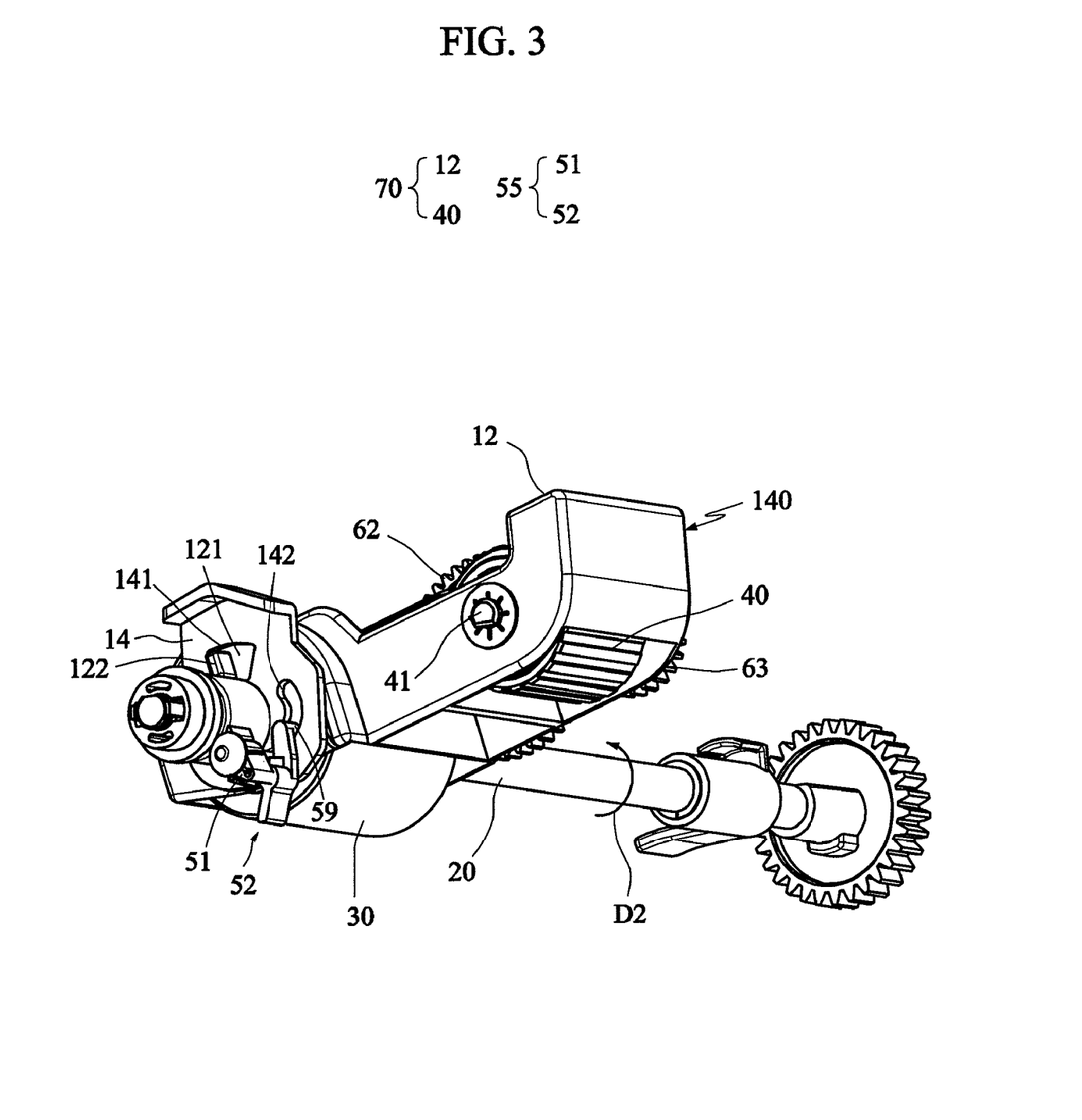
FIG. 3 is a pictorial view showing a sheet-stopping state of the sheet feeder according to the first embodiment of the invention.
Figure 4:
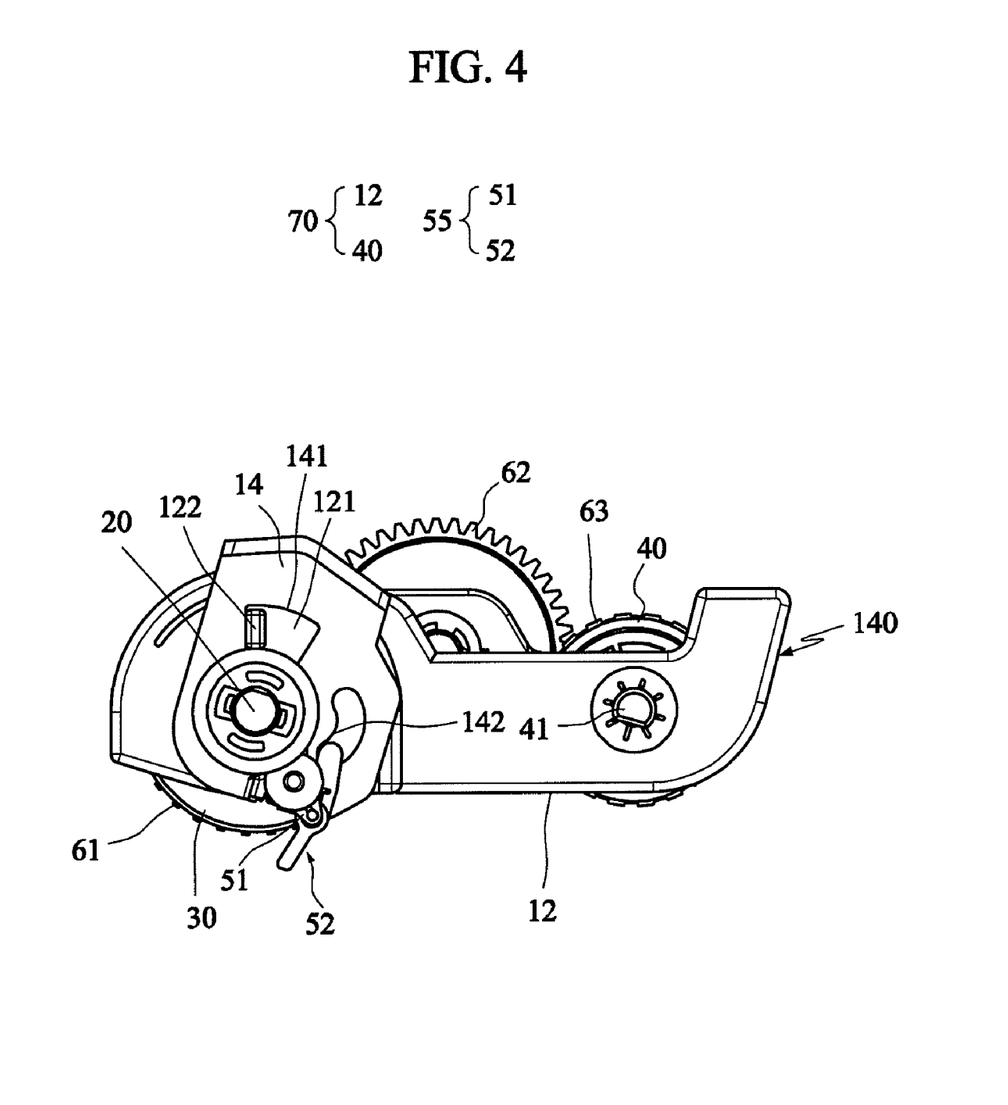
FIG. 4 is a schematic side view showing the sheet-stopping state of the, sheet feeder according to the first embodiment of the invention.

FIG. 2 is a pictorial view showing the sheet feeder 140 according to the first embodiment of the invention. FIGS. 3 and 4 are respectively a pictorial view and a schematic side view showing a sheet-stopping state of the sheet feeder 140 according to the first embodiment of the invention. Referring to FIGS. 1 to 4, the sheet feeder 140 includes a rotating shaft 20, a sheet-input roller 30, a pick-up mechanism 70 and a sheet-stopping mechanism 50. The pick-up mechanism 70, including a bracket 12 mounted on the rotating shaft 20 and a pick-up roller 40 mounted on the bracket 12, picks up the sheet S from the paper tray 130. The rotating shaft 20 is rotatable in a first direction D1 and a second direction D2. In this embodiment, the first direction D1 is the sheet-feeding direction and the second direction D2 is the reverse direction. However, the invention is not particularly limited thereto.

The sheet-input roller 30 mounted on the rotating shaft 20 feeds the sheet S to the sheet-transporting mechanism 120. In this embodiment, the sheet-input roller 30 cooperates with a frictional element 150, such as a friction pad, to feed one single sheet S to the sheet-transporting mechanism 120. The sheet-transporting mechanism 120 includes many sets of rollers for transporting the sheet S past the top side of the image-reading module 110, and then transporting the sheet S out. The sheet-stopping mechanism 50 is driven independent of movement of the bracket 12 by the rotating shaft 20. The sheet-stopping mechanism 50 switches between the sheet-stopping state and a sheet-non-stopping state. The details will be described in the following.

The sheet-stopping mechanism 50/50' includes a driving member 21 (see FIGS. 7A to 9 for details), which is mounted on and rotated with the rotating shaft 20, and a shutter 55. The driving member 21 actuates the shutter 55 to advance and retract. The pick-up roller 40 is disposed on the bracket 12, and the rotating shaft 20 rotates to rotate the pick-up roller 40 relatively to the sheet-input roller 30. Thus, the pick-up roller 40 can be either lowered down to pick up the sheet S, or lifted up to stay in a standby mode. When the next sheet needs to be picked up, the pick-up roller 40 may be again lowered down to pick up the next sheet. In addition, the sheet feeder 140 may include a mounting holder 14. The sheet feeder 140 can be attached to the body 100 and fixed in place through the mounting holder 14.

A first gear 61 is mounted on the rotating shaft 20, a second gear 62 is mounted on the bracket 12, and a third gear 63 is mounted on a spindle 41 of the pick-up roller 40. The second gear 62 meshes with the first gear 61 and the third gear 63 such that the pick-up roller 40 may be rotated with the rotation of the rotating shaft 20.

Figure 5:
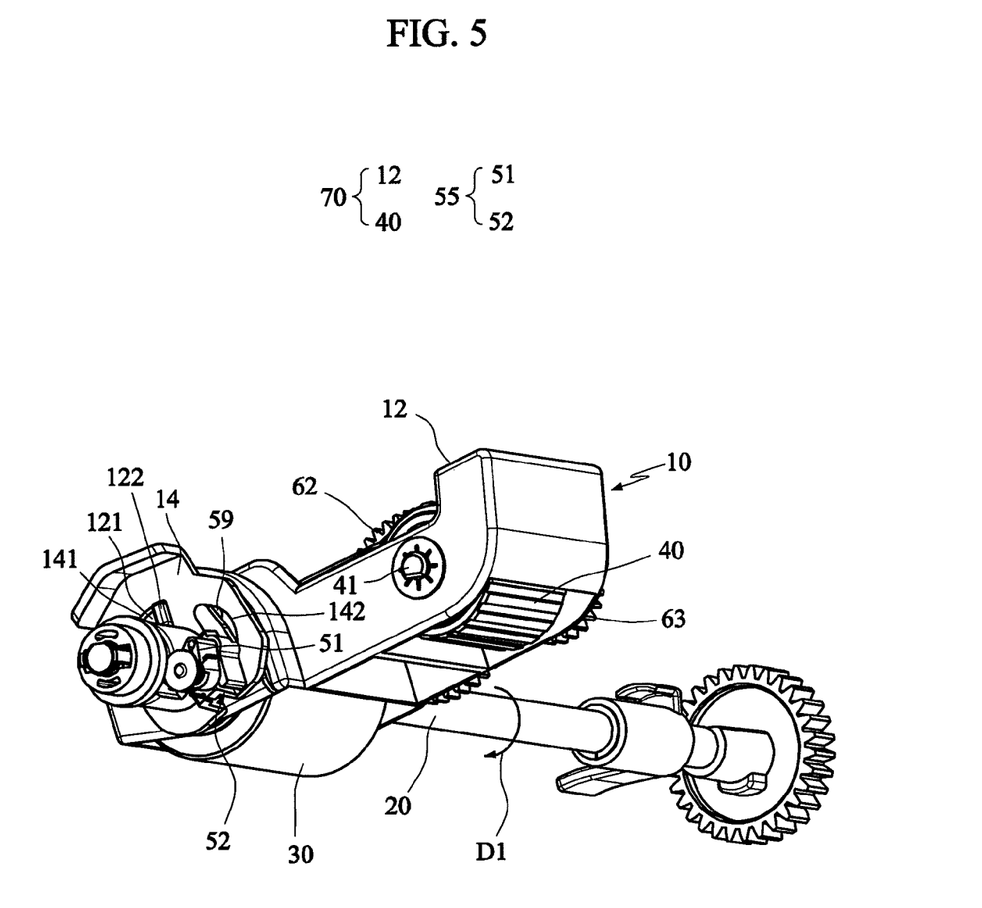
FIG. 5 is a pictorial view showing a sheet-non-stopping state of the sheet feeder according to the first embodiment of the invention.
Figure 6:
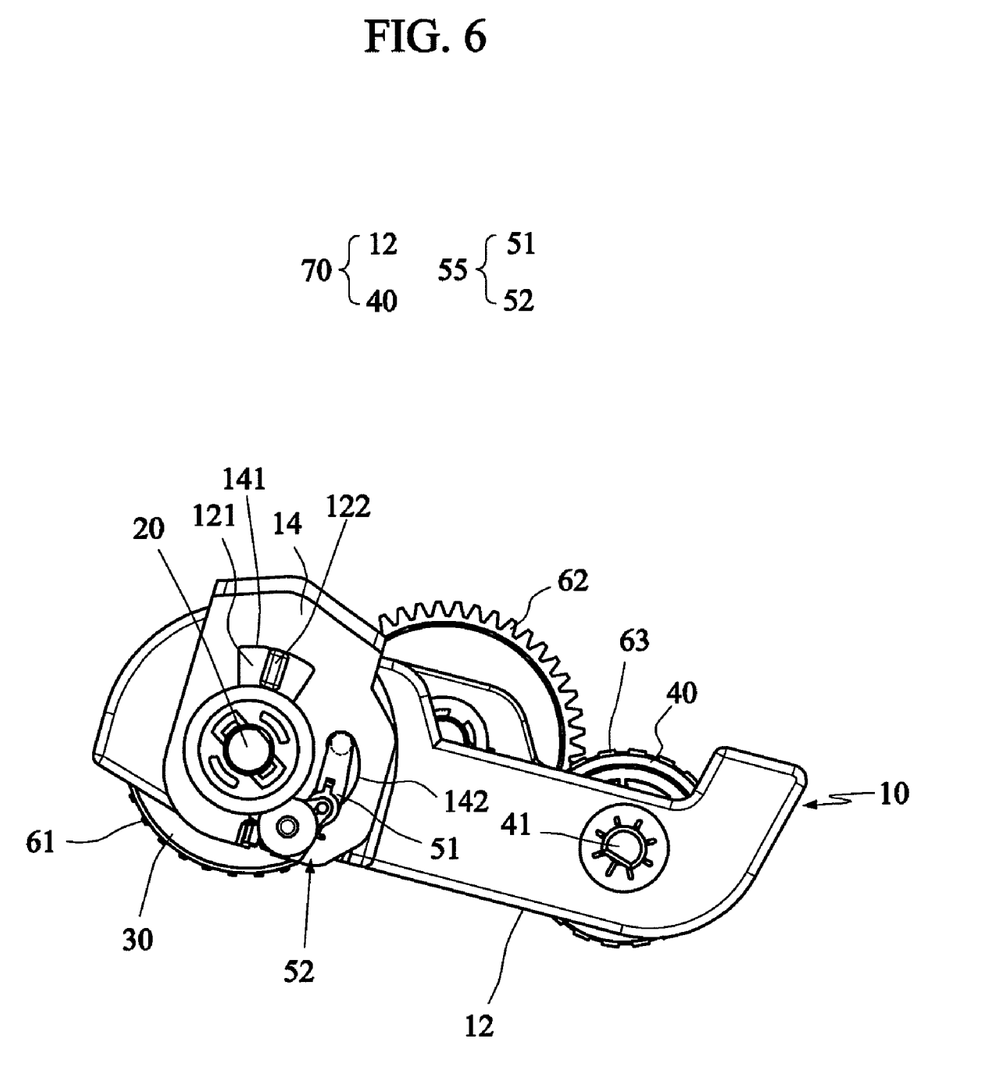
FIG. 6 is a schematic side view showing the sheet-non-stopping state of the sheet feeder according to the first embodiment of the invention.

FIGS. 5 and 6 are respectively a pictorial view and a schematic side view showing the sheet-non-stopping state of the sheet feeder 140 according to the first embodiment of the invention. As shown in FIGS. 3 to 6, the sheet-input roller 30 and the pick-up roller 40 are mounted on the bracket 12. The mounting holder 14 is sleeved on the rotating shaft 20 and coaxially to the bracket 12. In this embodiment, the mounting holder 14 is disposed next to a side surface 121 of the bracket 12. The mounting holder 14 limits movement of the bracket 12 and the shutter 55. A first slot 141 is formed in the mounting holder 14. The first slot 141 ccommodates a projection 122 protruding from the bracket 12 and limits a rotation angle of the bracket 12 relative to the mounting holder 14, or the bracket 12 might hit the body 100 as it swings up and down.

Figure 7A:
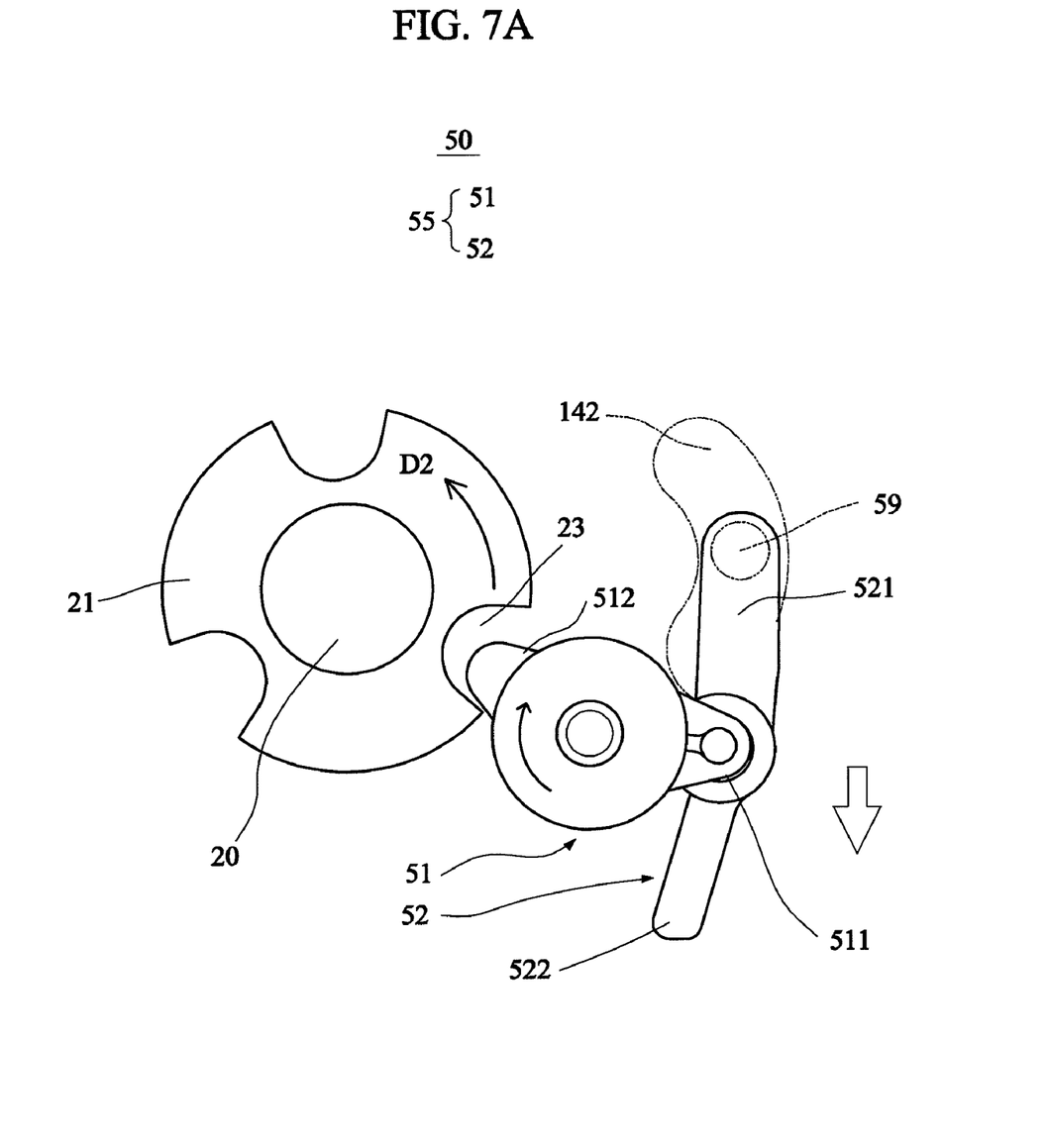
FIGS. 7A and 7B are partial schematic illustrations showing a transition of the sheet-stopping mechanism from the sheet-non-stopping state to the sheet-stopping state according to the first embodiment of the invention.
Figure 7B:
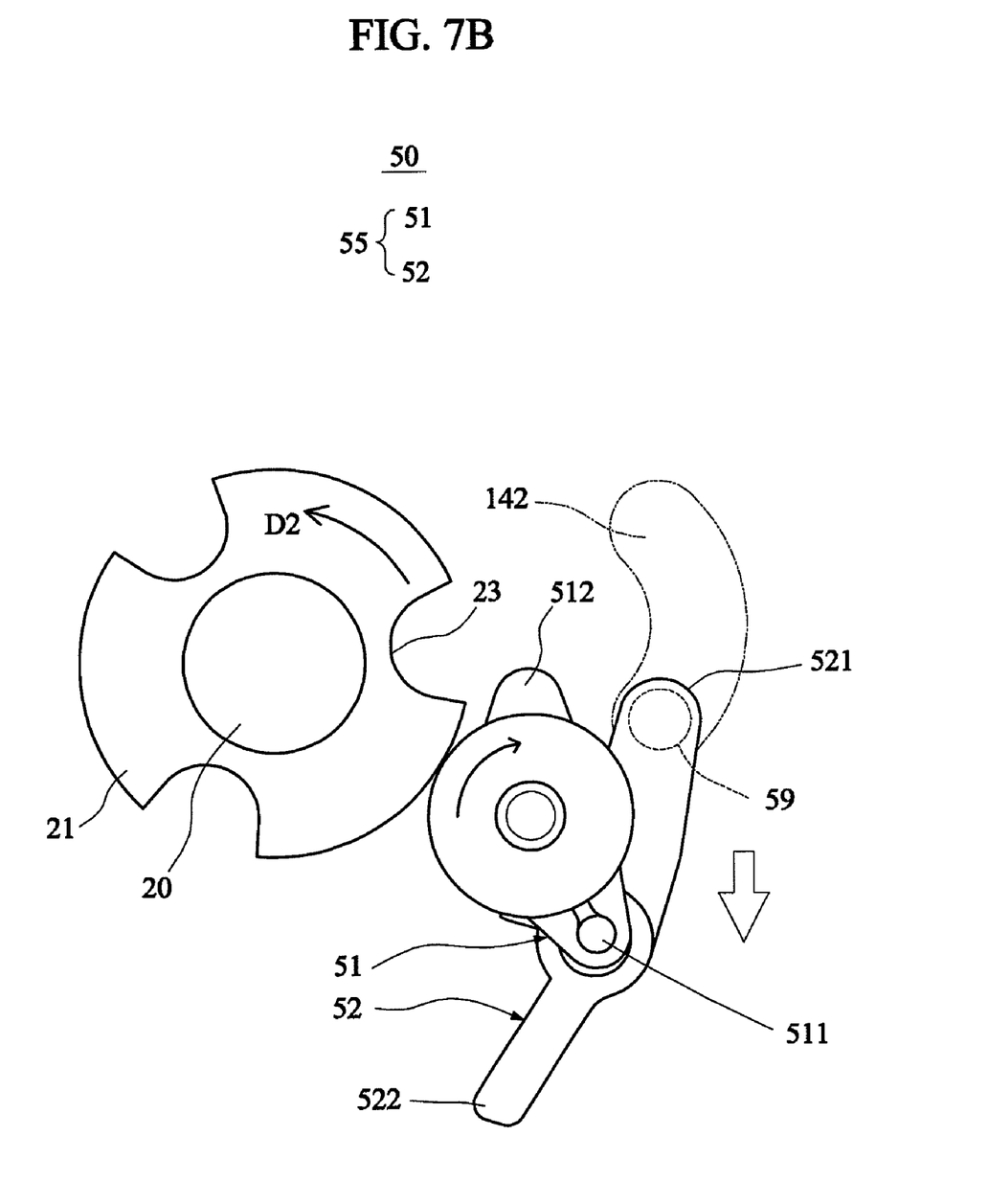
Figure 8:
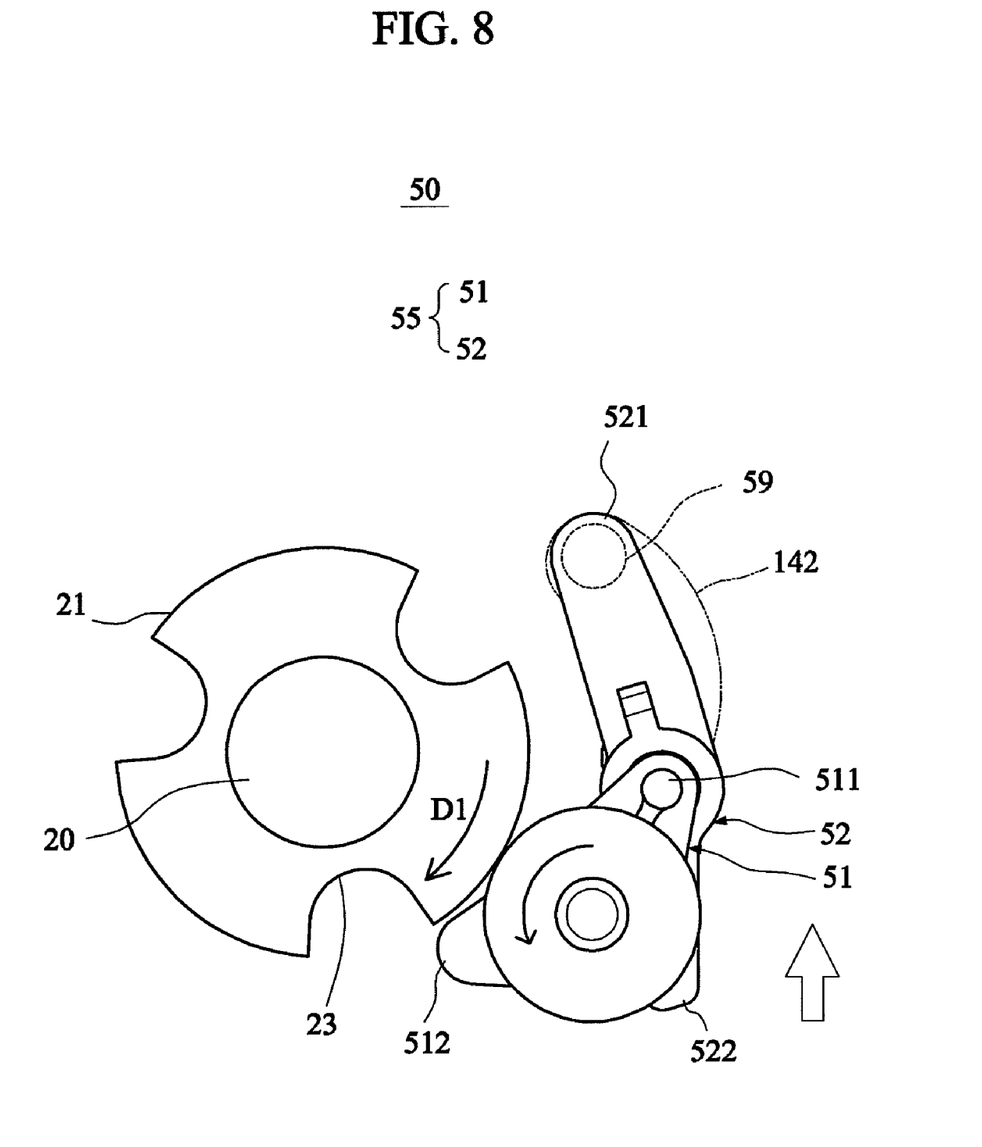
FIG. 8 is a partial schematic illustration showing the sheet-non-stopping state of the sheet-stopping mechanism according to the first embodiment of the invention.

FIGS. 7A and 7B are partial schematic illustrations showing the transition of the sheet-stopping mechanism from the sheet-non-stopping state to the sheet-stopping state according to the first embodiment of the invention. FIG. 8 is a partial schematic illustration showing the sheet-non-stopping state of the sheet-stopping mechanism 50 according to the first embodiment of the invention. Referring to FIGS. 7A and 7B, the driving member 21 has a concave portion 23 interacting with a convex portion 512 of the shutter 55. The concave portion 23 through the interaction actuates the shutter 55 to advance and retract. In this embodiment, the shutter 55 includes a first body 51 and a second body 52. The first body 51, pivotally mounted on a pivot pin 143 (see FIG. 9), interacts with the driving member 21. The convex portion 512 is formed on the first body 51. The second body 52, linked to one end 511 of the first body 51, advances and retracts as the driving member 21 is rotated with the rotating shaft 20. Through the interaction between the concave portion 23 of the driving member 21 and the convex portion 512 of the first body 51, the driving member 21 drives the first body 51 and the linked second body 52 to move as the driving member 21 is rotated with the rotating shaft 20. A free end 522 of the second body 52 serves as a stopper blocking up the passage to the sheet-input roller 30. Referring to FIG. 8, as the driving member 21 is rotating with the rotating shaft 20 in the sheet-feeding direction D1, the free end 522 is retracted to an upper position; and as the driving member 21 is rotating with the rotating shaft 20 in the reverse direction D2, the free end 522 advances to a lower position and blocks up the passage. As a result, the sheet-stopping mechanism 50 promptly switches its state when the rotation direction of the rotating shaft 20 changes. In this first embodiment, a guiding rod 59 is disposed on the other end 521 of the second body 52. The mounting holder 14 is formed with a second slot 142 which provides a guiding track for the shutter 55. The guiding rod 59 slides within the second slot 142.

Generally speaking, when the scan apparatus 1 is on standby, the sheet-stopping mechanism 50 is switched to the sheet-stopping state to prevent users from inserting the sheets into the nip between the sheet-input roller 30 and the friction pad 150. If multiple sheets S are taken to the sheet-transporting mechanism 120 and image-reading module 110, errors might occur. When the scan apparatus 1 starts the scan procedure, the sheet-stopping mechanism 50 is switched to the sheet-non-stopping state to allow the sheet S picked up by the pick-up roller 40 from the paper tray 130 to enter the nip between the sheet-input roller 30 and the friction pad 150. The sheet-input roller 30 and the friction pad 150 then feed the sheet S, one by one, into a sheet passageway 15, so that the image-scan step can be performed. The rotating shaft 20 rotates in the sheet-feeding direction D1 to enable the sheet-stopping mechanism 50 to enter the sheet-non-stopping state, in which the sheet S is allowed to come into contact with the sheet-input roller 30. As shown in FIGS. 5, 6 and 8, when being switched to the sheet-non-stopping state, the driving member 21 is rotated in the sheet-feeding direction D1 and drives the first body 51, thereby causing the one end 522 of the second body 52, where the sheet-stopping plate is disposed, to retract because it is linked with the first body 51. Thus, no blocker exists in the passageway between the pick-up roller 40 and the sheet-input roller 30, and the sheet S may thus be smoothly fed to the sheet-input roller 30.

As shown in FIGS. 3, 4, 7A and 7B, when being switched to the sheet-stopping state, the driving member 21 is rotated in the reverse direction D2 and drives the first body 51, thereby causing the one end 522 of the second body 52 to protrude out so that the sheet S is stopped in front of the sheet-input roller 30. The rotating shaft 20 rotates in the reverse direction D2 to enable the sheet-stopping mechanism 50 to enter the sheet-stopping state, in which a passage to the sheet-input roller 30 is blocked up by the shutter 55 and the sheet S is prevented from entering the nip between the sheet-input roller 30 and the friction pad 150. The sheet-stopping mechanism 50 works independent of the movement of the bracket 12, and is not driven by or linked to the bracket 12. In addition, in the sheet-stopping state, the bracket 12 does not swing up in sync with the change of rotation direction of the rotating shaft 20, but is free to pivotally rotate about the axis of the rotating shaft 20. The height of the pick-up roller 40 is freely adjusted as the users place a stack of sheets S on the paper tray 130 and in front of the second body 52. As shown in FIG. 1, the height of the pick-up roller 40 is dependent on the thickness of the paper stack, and the pick-up roller 40 rests on top of the paper stacks. In this embodiment, which is different from the prior art where the sheet-stopping plate is disposed at the center of the passage, the sheet-stopping section 522 of this invention is mounted at one side of the passage. In addition, the width of the sheet-stopping surface of the sheet-stopping section 522 of this invention is much smaller than the axial width of the sheet-input roller or the pick-up roller.

Figure 9:
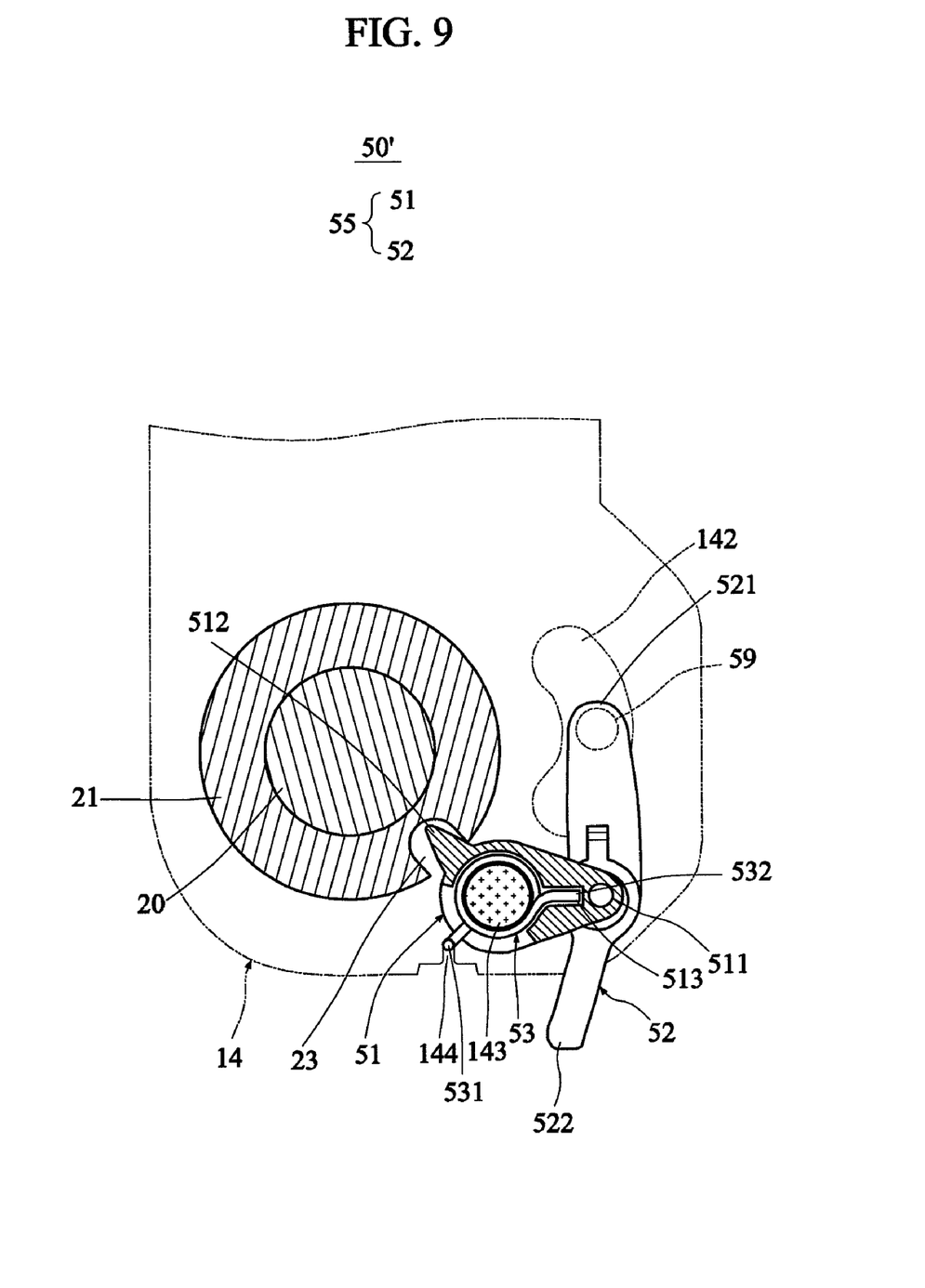
FIG. 9 is a partial schematic illustration showing a sheet-stopping mechanism according to a second embodiment of the invention.

FIG. 9 is a partial schematic illustration showing the sheet-stopping mechanism 50' according to the second embodiment of the invention. As shown in FIG. 9, the second embodiment is similar to the first embodiment except that the sheet-stopping mechanism 50' further includes a torsion spring 53. The torsion spring 53, pivotally mounted on the pivot pin 143 on which the first body is mounted and having one end 532 fixed, provides a resilient force to the first body 51 and facilitates returning the first body 51 to the sheet-stopping state. The end 532 is positioned in a retaining slot 513 of the first body 51, and the other end 531 of the torsion spring 53 is positioned in a retaining slot 144 of the mounting holder 14 or of the body 100. The torsion spring 53 is coiled around the pin 143.

This present invention utilizes the exterior formation of the components and the interaction there among to accomplish the operation of the sheet-stopping mechanism, and thus enhances the execution of the sheet-stopping mechanism. For example, at the moment the rotating shaft is rotated, the state of the sheet-stopping mechanism is switched. According to the present invention, the overall size of the sheet-stopping mechanism can be effectively reduced. In addition, the sheet feeder does not need a sensor to detect the action of the sheet-stopping mechanism for ensuring the correctness and certainty in the sheet-stopping operation. Since no sensor is needed, the manufacturing cost can be reduced. Furthermore, the sheet-stopping operation of the sheet-stopping mechanism does not affected by the upward and downward swing of the pick-up mechanism. Instead, the rotation direction of the rotating shaft controls the operation of the sheet-stopping mechanism. The sheet-stopping mechanism acts independent of the motion of the pick-up mechanism, or the angle of the bracket. Furthermore, since the motor for driving the sheet-stopping mechanism need not overcome a large torque and it drives a lighter-weighted sheet-stopping mechanism, the chance to overload the motor is slim.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A sheet feeder having a sheet-stopping function, the sheet feeder comprising:
    a rotating shaft, rotatable in a first direction and a second direction;
    a pick-up mechanism, for picking up a sheet, comprising a bracket mounted on the rotating shaft and a pick-up roller mounted on the bracket;
    a sheet-input roller, mounted on the rotating shaft, for feeding the sheet; and
    a sheet-stopping mechanism, driven independent of movement of the bracket by the rotating shaft, switching between a sheet-stopping state and a sheet-non-stopping state, the sheet-stopping mechanism comprising:
        a driving member, mounted on and rotated with the rotating shaft;
        a shutter, wherein the driving member actuates the shutter to advance and retract, and the shutter comprises:
        a first body, pivotally mounted on a pivot pin, interacting with the driving member; and
        a second body linked to one end of the first body, advancing and retracting as the driving member is rotated with the rotating shaft; and
        a torsion spring, pivotally mounted on the pivot pin and having one end fixed, providing a resilient force to the first body and facilitating returning the first body to the sheet-stopping state, wherein:
    the rotating shaft rotates in the first direction to enable the sheet-stopping mechanism to enter the sheet-non-stopping state in which the sheet is allowed to come into contact with the sheet-input roller; and
    the rotating shaft rotates in the second direction to enable the sheet-stopping mechanism to enter the sheet-stopping state in which a passage to the sheet-input roller is blocked up.

2. The sheet feeder according to claim 1, wherein in the sheet-stopping state the bracket of the pick-up mechanism is free to pivotally rotate about the axis of the rotating shaft.

3. The sheet feeder according to claim 1, wherein the driving member comprises a concave portion interacting with a convex portion of the shutter and actuating the shutter to advance and retract.

4. The sheet feeder according to claim 1, further comprising:
   a mounting holder, sleeved on the rotating shaft, limiting movement of the bracket and the shutter.

5. The sheet feeder according to claim 4, wherein a first slot is formed in the mounting holder and the first slot accommodates a projection protruding from the bracket and limits a rotation angle of the bracket.

6. The sheet feeder according to claim 4, wherein the mounting holder is formed with a second slot which provides a guiding track for the shutter.

7. A scan apparatus, comprising:
   an image-reading module;
   a sheet-transporting mechanism;
   a paper tray; and
   a sheet feeder for picking up and feeding a sheet from the paper tray to the sheet-transporting mechanism, wherein the sheet-transporting mechanism transports the sheet past the image-reading module, the image-reading module acquires an image of the sheet, and the sheet feeder comprises:
   a rotating shaft, rotatable in a first direction and a second direction;
   a pick-up mechanism, for picking up the sheet from the paper tray, comprising a bracket mounted on the rotating shaft and a pick-up roller mounted on the bracket;
   a sheet-input roller, mounted on the rotating shaft, for feeding the sheet to the sheet-transporting mechanism; and
   a sheet-stopping mechanism, driven independent of movement of the bracket by the rotating shaft, switching between a sheet-stopping state and a sheet-non-stopping state, the sheet-stopping mechanism comprising:
   a driving member, mounted on and rotated with the rotating shaft;
   a shutter, wherein the driving member actuates the shutter to advance and retract, and the shutter comprises:
   a first body, pivotally mounted on a pivot pin, interacting with the driving member; and
   a second body linked to one end of the first body, advancing and retracting as the driving member is rotated with the rotating shaft; and
   a torsion spring, pivotally mounted on the pivot pin and having one end fixed, providing a resilient force to the first body and facilitating returning the first body to the sheet-stopping state, wherein:
   the rotating shaft rotates in the first direction to enable the sheet-stopping mechanism to enter the sheet-non-stopping state in which the sheet is allowed to come into contact with the sheet-input roller; and
   the rotating shaft rotates in the second direction to enable the sheet-stopping mechanism to enter the sheet-stopping state in which a passage to the sheet-input roller is blocked up.

8. The scan apparatus according to claim 7, wherein the sheet feeder further comprises:
   a mounting holder, sleeved on the rotating shaft, limiting movement of the bracket and the shutter and attaching the sheet feeder to a body of the scan apparatus.

9. The scan apparatus according to claim 8, wherein a first slot is formed in the mounting holder and the first slot accommodates a projection protruding from the bracket and limits a rotation angle of the bracket.

10. The scan apparatus according to claim 8, wherein the mounting holder is formed with a second slot for providing a guiding track for the shutter.

11. The scan apparatus according to claim 7, wherein in the sheet-stopping state the bracket of the pick-up mechanism is free to pivotally rotate about the axis of the rotating shaft.

12. The scan apparatus according to claim 7, wherein the driving member comprises a concave portion interacting with a convex portion of the shutter and actuating the shutter to advance and retract.

* * * * *